United States Patent
Tsai et al.

[11] Patent Number: 6,166,467
[45] Date of Patent: Dec. 26, 2000

[54] MOTOR HOUSING

[75] Inventors: Wei-Shin Tsai, Hsinchu; Chia-Lin Wang, Chiayi, both of Taiwan

[73] Assignee: Industrial Technology Research Institute, Hsinchu, Taiwan

[21] Appl. No.: 09/209,040

[22] Filed: Dec. 10, 1998

[51] Int. Cl.[7] .................................................. H02K 5/00
[52] U.S. Cl. ............................................................ 310/89
[58] Field of Search ................................. 310/89, 91, 217

[56] References Cited

U.S. PATENT DOCUMENTS

| | | | |
|---|---|---|---|
| 599,918 | 3/1898 | Short | 310/89 |
| 666,656 | 1/1901 | Eaton | 310/91 |
| 1,370,895 | 3/1921 | Loomis | 310/89 |
| 2,588,156 | 3/1952 | Ogilvy | 310/91 |
| 3,035,192 | 5/1962 | Schaefer | 310/89 |
| 4,103,192 | 7/1978 | Wendt et al. | 310/91 |

*Primary Examiner*—Clayton LaBalle
*Attorney, Agent, or Firm*—Rabin & Champagne, P.C.

[57] ABSTRACT

An improved motor housing with a slop structure at one side of the housing, the slot structure is arranged with ledges along its outer edges in which several threaded holes are provided for placing bolts through which clamping level of the outer body can be controlled so that a stator core can be inserted or removed easily and repeatedly, resulting in low cost, simplified assembling process, and facilitating modification and test of a motor in the development stage in research institutions.

4 Claims, 5 Drawing Sheets

MOTOR HOUSING

FIELD OF THE INVENTION

The present invention involves a motor, especially an improved motor housing facilitating to modify and test a primary motor design.

BACKGROUND OF THE INVENTION

A conventional motor housing is shown in FIG. 1. The housing 10 is integrally shaped type and has an outer body 11 with unenclosed upper and lower parts. In the development stage, the outer body 11 to be used is generally made from steel or aluminium material, and a stator core (not shown in FIG. 1) is fit tightly in it. For the outer body 11 is shaped, it is necessary to heat up the outer body 11 to expand the fitting space extent for the stator core inserted in it by means of a special fixture, and the stator core is fit tightly with the outer body when the outer body 11 is cooled down. However, in the development stage, it is possible that the stator core may not meet the desired characteristics and sometimes, it is necessary to remove and change it. But, the cooled outer body 11 is fit tightly with the stator core, so it is difficult to separate them from each other, therefore, the outer body 11 is generally to be destroyed for separating the stator core from it. That causes large consumption of the outer body 11, meanwhile, when the outer body 11 is fit with the stator core, a heating device must be provided to expand the fitting space extent of the outer body for the stator core inserting and the tight fit can not be obtained until the heated element is cooled down, which results in a complex assembling process and time expending. In case of removing and changing the stator core, the outer body 11 must be destroyed so that the stator core can be removed by a special fixture, however, the stator core may be damaged carelessly in the destroying process of the outer body 11, resulting in development cost increasing. Therefore, the inventor develops a motor housing which features its simple assembly and cutting down working hours and cost for a motor development.

SUMMARY OF THE INVENTION

The major object of the present invention is to provide an improved motor housing which may give an effective simplified assembling process, the outer body has a slot structure at a proper point, the slot structure is arranged with ledges along its outer edges in which several threaded holes and through holes are provided for placing bolts through which a gap of the slot structure can be controlled so that a stator can be inserted or removed directly and easily. The structure provided easy and quick assembling process facilitating modification and testing of a motor in a development stage, therefore, it can be used widely in research/development institutions.

Another object of the present invention is to provide an improved motor housing which has a C shaped outer body whose clamping level can be controlled for a stator core inserting/removing repeatedly without a heating device for the inserting process and the outer body destroyed so that the cost for a motor development can be cut down.

The object, characteristics and functions of the present invention can be best described in detail in conjunction with the accompanying drawings and the following embodiment hereinafter:

DETAILED DESCRIPTION OF THE INVENTION

Figure 1:
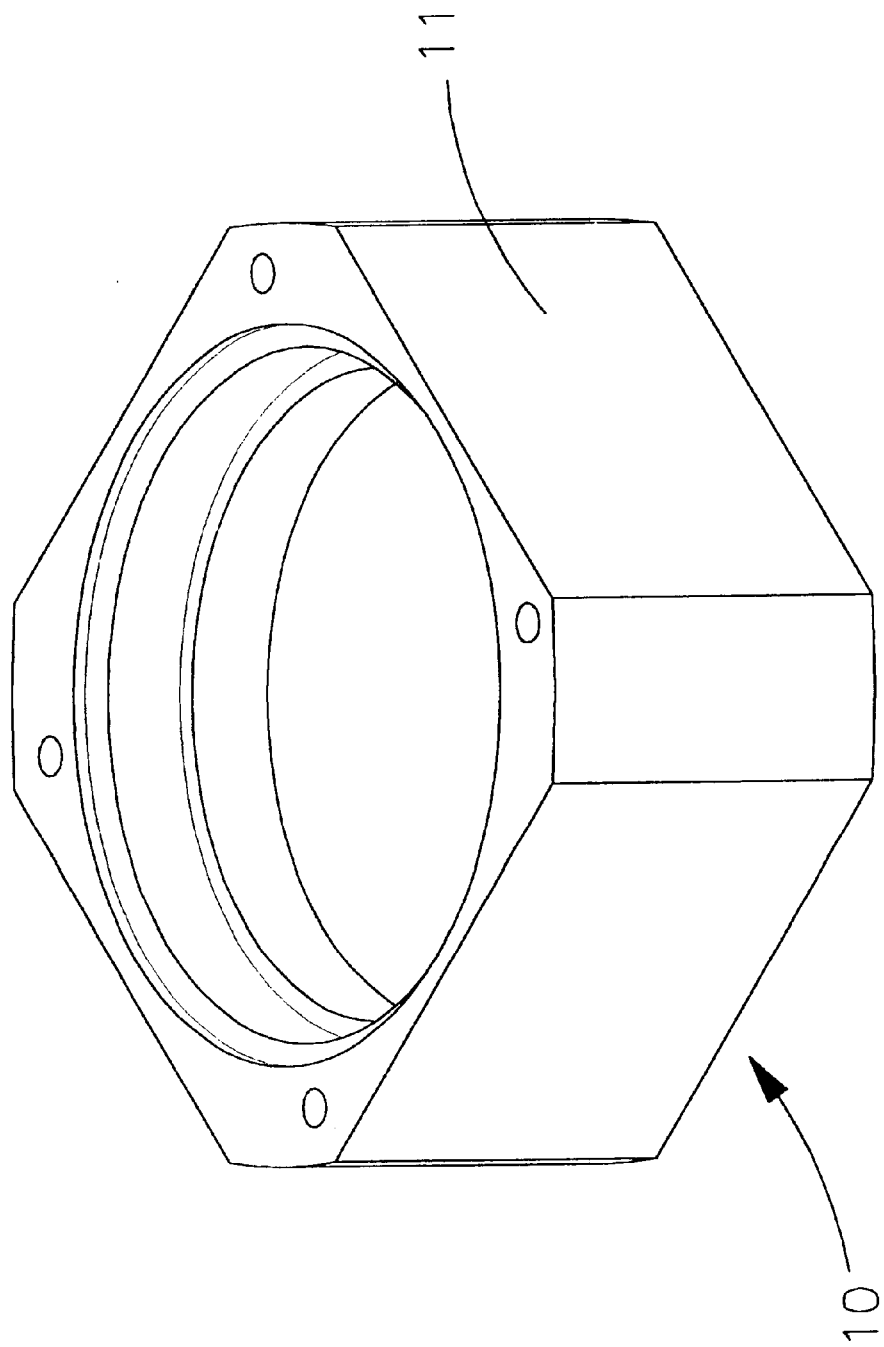
FIG. 1 is a schematic view of a conventional motor housing.
Figure 2:
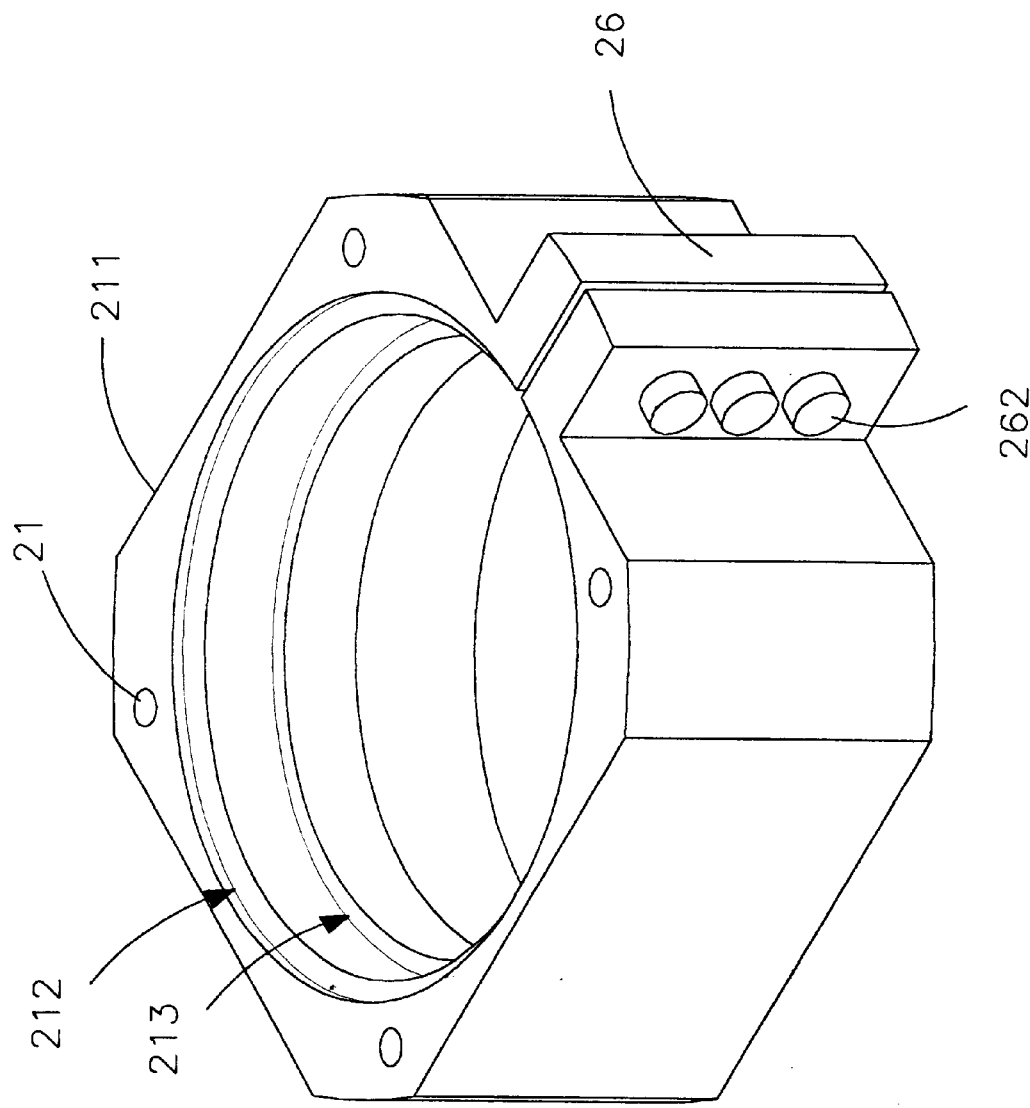
FIG. 2 is a schematic view of a motor housing of the present invention.
Figure 3:
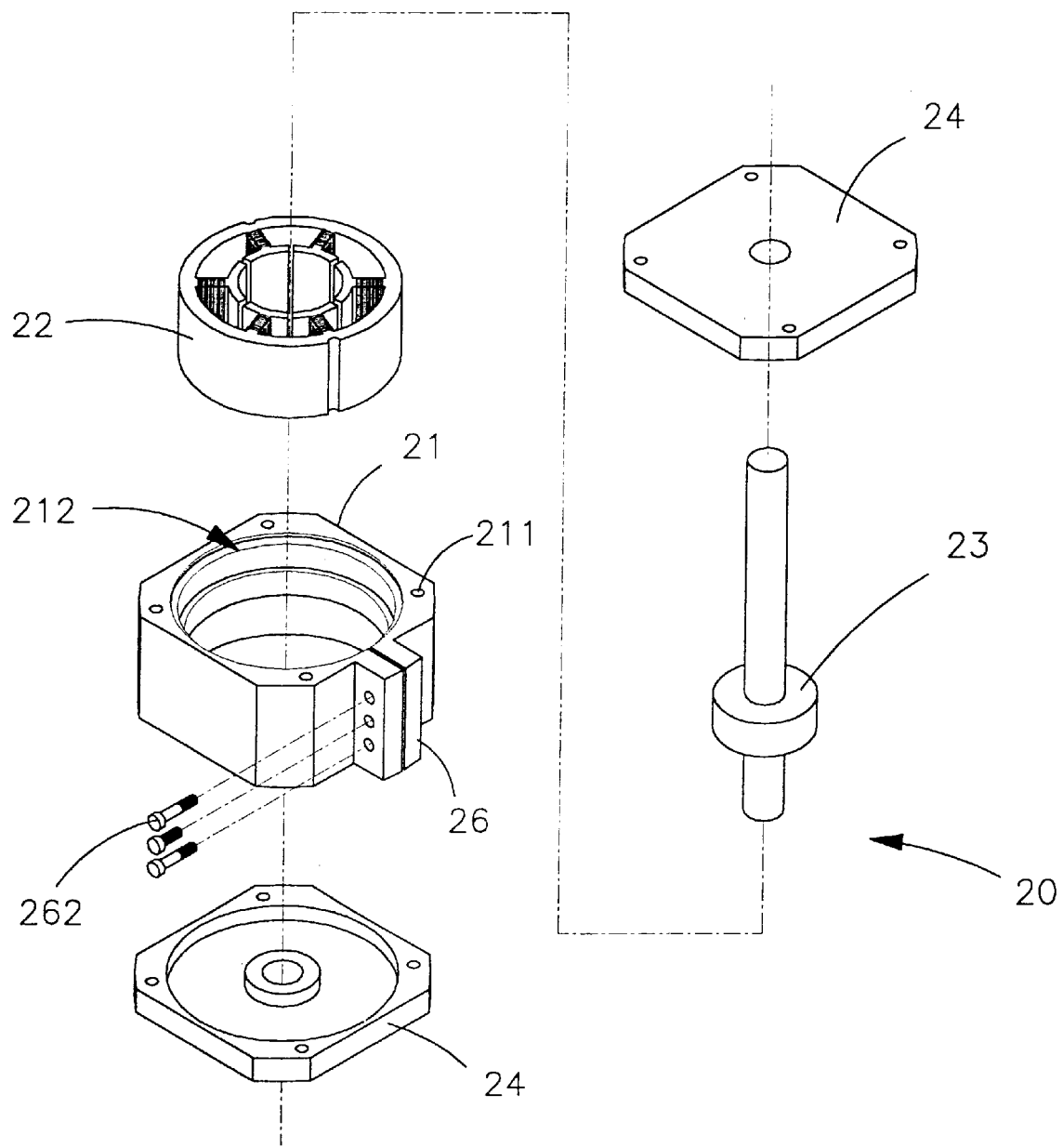
FIG. 3 is a schematic exploded view of a motor housing of the present invention.
Figure 4:
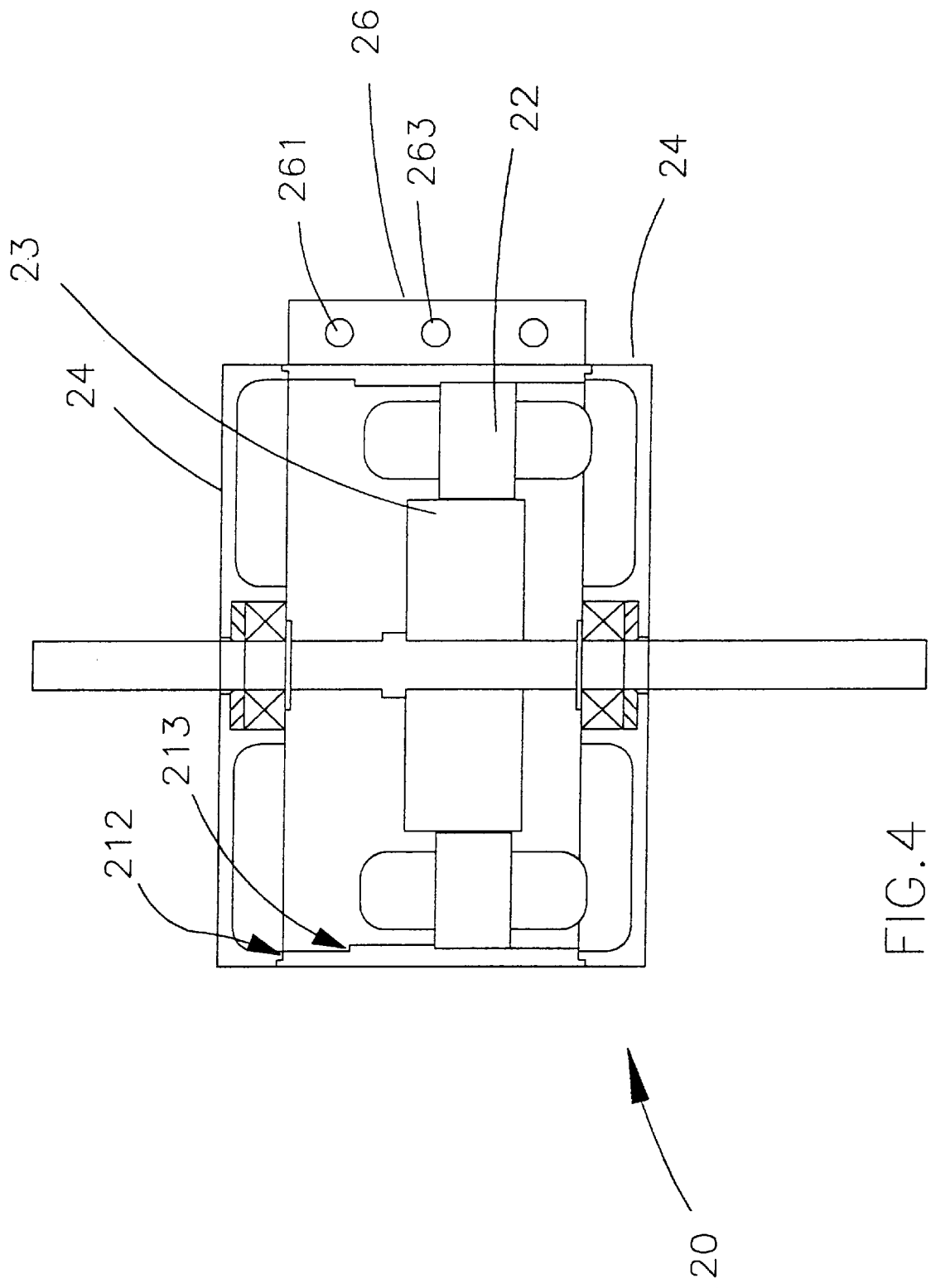
FIG. 4 is a schematic sectional view of a motor housing of the present invention.

According to FIG. 2 and FIG. 3, the motor housing assembly 20 consists of an outer body 21, a stator 22, a rotor 23 and covers 24. The outer body 21 is an integrally shaped casing which has unenclosed upper and lower parts and a slot structure provided at a proper point in it to form an opening 25 (FIG. 5A) at whose opposite side two ledges 26 extending outward the main body are arranged. In the ledges 26 there are several through holes 261 provided for placing bolts 262 to control clamping level of the outer body 21. When the bolts 262 are unscrewed, the outer body 21 may expand outward so that the stator 22 may be inserted or removed easily, or the stator 22 can be turned by a desired angle in the space provided, then the stator 22 may be positioned in the outer body 21 by screwing properly the bolts 262 to control the clamping level of the outer body 21. A threaded hole 211 is arranged at a proper position of each corner of top and bottom sides of the outer body 21. A matching recess 212 is provided on the top and bottom sides of the outer body 21 for matching covers 24 and for positional correction of the stator 22 and the rotor 23. Meanwhile, an excellent clapping condition of the outer body 21 call be obtained by setting the bolts 262 in order to carry out the followed test process.

Figure 5A:
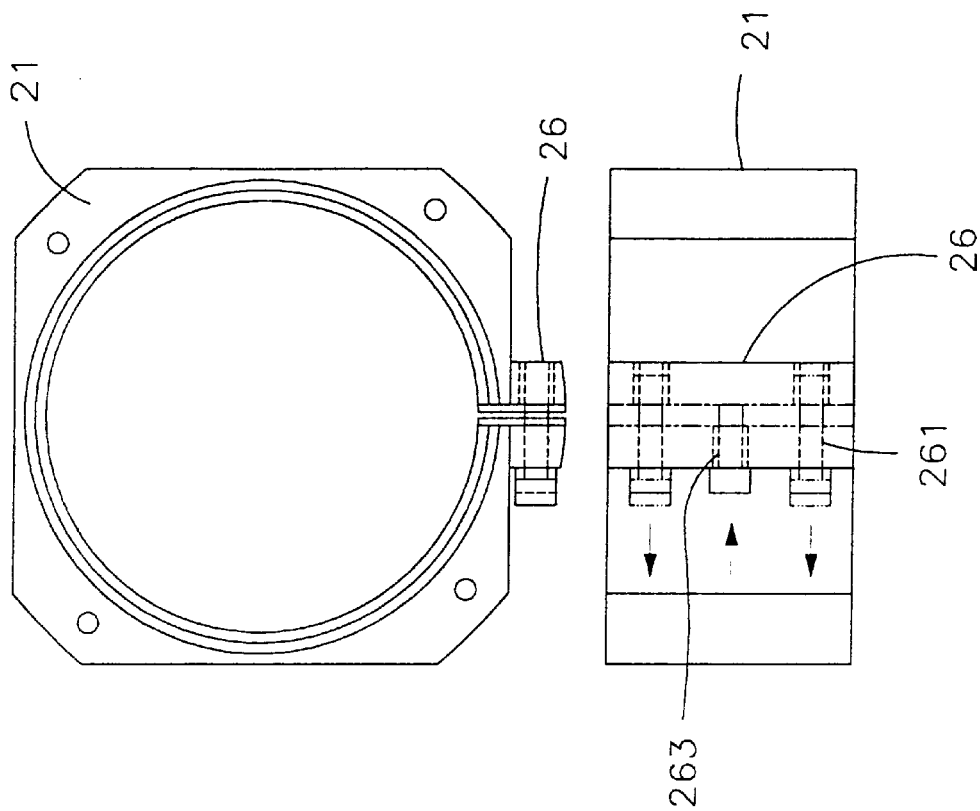
FIGS. 5A and 5B are schematic views of a motor housing in opened/closed condition of the present invention.
Figure 5B:
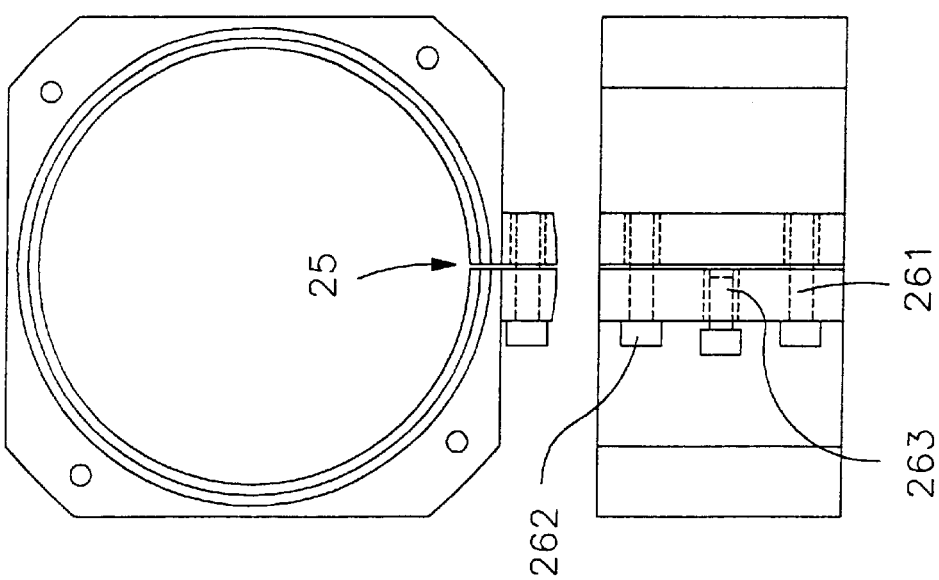

According to FIGS. 5A and 5B, in embodiment of the present invention, two through holes 261 are provided in one of the ledges 26. In another ledge 26 two threaded holes corresponding to the holes 261 are provided for bolt 262 inserting to lock up the outer body 21 (as shown in FIG. 5A). In the former ledge 26 a through threaded hole 263 is provided. A bolt 262 is screwed in the hole 263 to open the outer body 21 by pushing the another ledge 26 (as shown in FIG. 5B), i.e. when the stator 22 is to be inserted/removed, it is necessary to unscrew the bolts 262, to screw in the bolt 262 to expand the slot structure to a proper gap so that the outer body 21 is opened facilitating insertion/removal of the stator 22 and the rotor 23. It is noted that the outer body 21 is made usually from aluminium or other metal material, so, the slot structure 25 shall be expanded within the elasticity limit of the material to be used to prevent its rigidity from being damaged. Therefore, the present invention is really able to simplify the assembling and positioning process of a stator core, to short the period of time for motor modification and testing, and to cut down the cost in the development stage of a motor in research institutions.

As seen according to the above, the present invention "Improved Motor Housing" has really the practical applicability and creativeness, besides, the present invention has never been disclosed in any publication so that it conforms to the regulations stipulated in the Patent Law.

The embodiment mentioned above is only a better example for the present invention, and shall not restrict the range of embodiment of the present invention to it, and any modification or/and change made based on the present invention shall be considered to be covered by the present invention.

What is claimed is:

1. A motor housing, comprising:

an outer body having a slot formed therein, and having first and second ledges disposed on opposite sides of the slot;

at least one first bolt extending within both the first and the second ledge, so that when the at least one first bolt is tightened, the first and second ledge are urged toward each other; and a second bolt extending within the first ledge, wherein when the second bolt is tightened, an end of the second bolt pushes against the second ledge, whereby when the at least one first bolt is loosened, and the second bolt is tightened, the second bolt urges the first and second ledge away from each other.

2. The motor housing recited in claim 1, wherein said at least one first bolt comprises two bolts, wherein the first ledge has respective through holes therein for accommodating the respective two bolts, and wherein the second ledge has respective through or threaded holes for accommodating the respective two bolts.

3. The motor housing recited in claim 2, wherein the second bolt is disposed between the two bolts, and wherein the first ledge has a threaded through hole for accommodating the second bolt.

4. The motor housing recited in claim 1, wherein said outer body has an opening therein for accommodating a stator, wherein when said at least one first bolt is tightened and said second bolt is loosened, the stator is irremovably held within said outer body, and wherein when said at least one first bolt is loosened and said second bolt is tightened, the stator is freely removable from within said outer body.

* * * * *